No. 870,248. PATENTED NOV. 5, 1907.
H. A. PALMER.
PNEUMATIC TIRE.
APPLICATION FILED APR. 5, 1906.

Witnesses
G. J. Mead
Florence Stockert

Inventor.
Harry A. Palmer
By J. C. & H. M. Sturgeon
Atty's.

UNITED STATES PATENT OFFICE.

HARRY A. PALMER, OF AKRON, OHIO.

PNEUMATIC TIRE.

No. 870,248.

Specification of Letters Patent.

Patented Nov. 5, 1907.

Application filed April 5, 1906. Serial No. 310,084.

*To all whom it may concern:*

Be it known that I, HARRY A. PALMER, a citizen of the United States, residing at Akron, in the county of Summit and State of Ohio, have invented certain new and useful Improvements in Pneumatic Tires; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to pneumatic tires, and has for its objects the construction of a rifted pneumatic tire sheath, and the wheel rim therefor, in such a manner that the tire-sheath can be securely fastened to the rim so as to effectually prevent its creeping thereon, and can readily be removed therefrom to admit of the removal and insertion of the inner-tube. In accomplishing this result I make the tire-sheath of the usual shape, having an open rift in the inner face thereof, and with the edges of the rift non-extensible, and one edge of greater annular circumference than the other, so that one edge of the rift will rest on the periphery of the metal tire on the wheel-rim, while the other extends down into a recess formed by the cutting away of the edge of the metal tire, where pointed studs are provided which are pressed into the fabric of the sheath by the flanges bolted to the sides of the wheel-rim in the usual manner.

Figure 1:
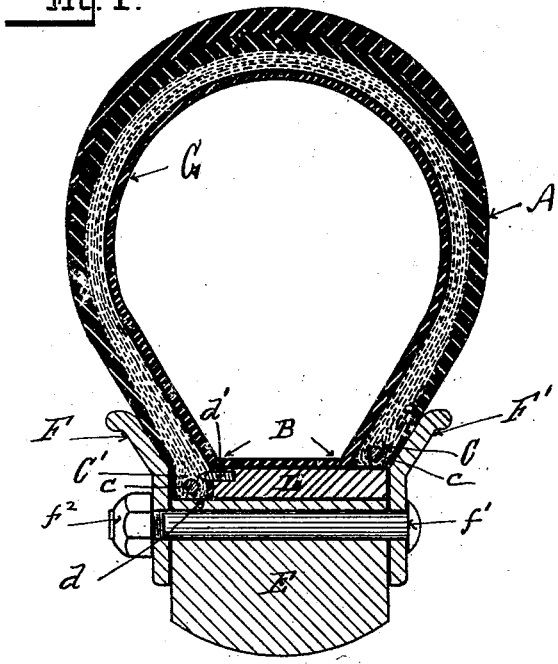
Figure 2:
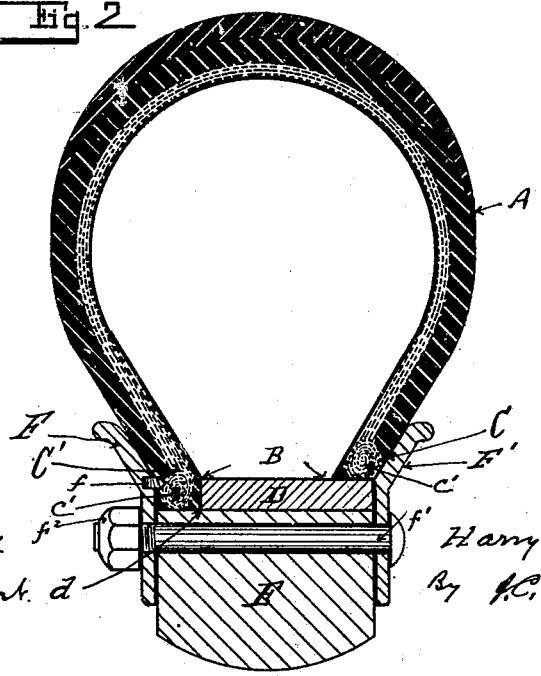

The features of this invention are hereinafter fully set forth and explained, and illustrated in the accompanying drawings in which:

Figure 1 is a transverse section of a wheel-rim and pneumatic tire embodying my invention. Fig. 2 is a like view showing a modified construction of the same.

In these drawings A is a pneumatic tire-sheath having a rift or opening B in its inner face. The edge C of the opening B is made of such annular circumference that it will fit closely around the periphery of the metal tire D on the wheel felly E, and the edge C′ of the opening B is made of smaller annular circumference so that it will fit closely on the base of the recess $d$, preferably formed by cutting away the edge of the metal tire D. The edges C and C′ of the tire-sheath are made non-extensible, preferably by vulcanizing non-extensible rings $c$ therein, as illustrated in Fig. 1, or by vulcanizing straight strips of fabric $c'$ therein as illustrated in Fig. 2.

To prevent creeping or rotation of the sheath A upon the metal tire D, I preferably secure, at suitable intervals, pointed studs $d'$ in the edge of the metal tire D, as illustrated in Fig. 1, or in lieu thereof, like pointed studs $f$ in the flange F which secures that side of the sheath in place, as illustrated in Fig. 2.

The flanges F and F′ for securing the sheath A to the wheel-rim are of the usual construction and are secured to the wheel-rim by bolts $f'$ and nuts $f^2$ in the usual manner. The inner-tube G is of the usual construction used in pneumatic tires.

When it is desired to remove the inner tube G from the sheath A, or to remove both the inner-tube and sheath from the wheel-rim D, the inner-tube is first deflated, the nuts $f^2$ on the bolts $f'$ are then removed and the flange F detached from the wheel felly. The edge C′ of the sheath A can then be moved outward and the inner-tube G removed therefrom and repaired and replaced in the sheath A, or if desired the sheath A can then be removed from the rim D.

Having thus shown and described my invention so as to enable others to construct and utilize the same, what I claim as new and desire to secure by Letters-Patent of the United States is:

1. The combination in a wheel-rim for pneumatic tires, of a metal tire having one edge thereof cut away, pointed studs in the cut-away edge of the tire, and a flange adapted to clamp the inner edge of the tire-sheath against the cut-away edge of the tire and the pointed studs therein, substantially as set forth.

2. The combination of a wheel-rim, a metal tire thereon having one edge thereof cut away, flanges removably bolted to the sides of the wheel-rim, a tire-sheath rifted at its inner face and having the edges of the rift therein non-extensible and one edge of the rift of greater annular circumference than the other, and pointed studs adapted to be pressed into the edge of the tire by the pressure exerted on the removable flanges, substantially as set forth.

In testimony whereof I affix my signature, in presence of two witnesses.

HARRY A. PALMER.

Witnesses:
MINNIE DELEHANTY,
F. H. STUART.